United States Patent [19]
Fife et al.

[11] Patent Number: 5,245,514
[45] Date of Patent: Sep. 14, 1993

[54] EXTRUDED CAPACITOR ELECTRODE AND METHOD OF MAKING THE SAME

[75] Inventors: James A. Fife, Thornbury, England; David A. Knudson, Gilbertsville, Pa.; Prabhat Kumar; Viren Pathare, both of Allentown, Pa.

[73] Assignee: Cabot Corporation, Boston, Mass.

[21] Appl. No.: 888,670

[22] Filed: May 27, 1992

[51] Int. Cl.⁵ .............................................. H01G 9/05
[52] U.S. Cl. ..................................... 361/529; 361/509
[58] Field of Search ............... 361/508, 509, 529, 530; 29/599

[56] References Cited

U.S. PATENT DOCUMENTS

| | | | |
|---|---|---|---|
| 3,277,564 | 10/1966 | Webber et al. | 19/419 |
| 3,540,114 | 11/1970 | Roberts et al. | 29/419 |
| 3,713,202 | 1/1973 | Roberts et al. | 29/599 X |
| 3,740,834 | 6/1973 | Douglass | 29/570 |
| 3,742,369 | 6/1973 | Douglass | 317/230 |
| 3,818,581 | 6/1974 | Vartanian et al. | 29/570 |
| 3,827,865 | 8/1974 | Douglass | 29/192 |
| 4,490,439 | 12/1984 | Stekly et al. | 428/614 |
| 4,502,884 | 3/1985 | Fife | 75/0.5 AB |
| 4,505,762 | 3/1985 | Fukutsuka et al. | 148/11.5 R |
| 4,723,355 | 2/1988 | Both et al. | 29/599 |
| 5,034,857 | 7/1991 | Wong | 361/509 |
| 5,088,183 | 2/1992 | Kanithi | 29/599 |

Primary Examiner—Marvin M. Lateef
Assistant Examiner—Michael D. Switzer
Attorney, Agent, or Firm—Harry J. Gwinnell

[57] ABSTRACT

Tantalum electrode material is produced which has extremely low tortuosity, exceptionally low ESL and ESR, potentially extended high frequency performance, very high volumetric efficiency, and reduced tantalum consumption per electrode. The electrode material is characterized by having a cross-section composed of plates of tantalum separated by spaced gaps resulting in a highly dense (volumetric efficiency) electrode. The plates are electrically interconnected which also adds to the structural stability of the article. This is made possible by being able to carefully control the geometry of the tantalum material during processing. A method for producing such material includes extruding a billet filled with a (preferentially geometrically uniform) mixture of rods of tantalum and an extrudable metal. When the billet has been sufficiently reduced in size and severed, the extrudable metal is removed by selectively dissolving with acid. In addition to the above advantages, the resulting article is particularly adapted for use in super-miniaturization applications.

29 Claims, 11 Drawing Sheets 100 um

100X

EXTRUDED CAPACITOR ELECTRODE AND METHOD OF MAKING THE SAME

TECHNICAL FIELD

The field of art to which this invention pertains is valve metal material, electrodes and capacitors made therefrom, and methods of making the same.

BACKGROUND ART

Tantalum capacitors of the solid-electrolyte type have been a major contributor to the miniaturization of electronic circuitry. They also have the advantage of operating over a wide temperature range and have good shelf life, long service life and are useful in extreme environments.

Typically such capacitors have been manufactured by compressing tantalum powder into a pellet, and sintering the pellet to form a porous body. The porous body is then anodized in a suitable electrolyte to form a continuous dielectric oxide film on the sintered body. The pores are filled with an electrolyte and a lead wire is attached to form the capacitor.

As the requirements for smaller and smaller anodes come out of the electronics industry with the increased miniaturization of electronics, this presents new challenges to the tantalum anode industry. With smaller and smaller anodes, the lack of high frequency performance of the anode becomes a bigger and bigger problem. Furthermore, the smaller the anode, the greater difficulty manufacturers are confronted with in automated handling of the anodes, e.g. in attaching a lead wire. Certain manipulation is required to attach such a wire, and it becomes difficult to handle the miniaturized anodes in a manner sufficient to cost effectively attach such a wire.

Accordingly, what is needed in the art is an improved method for making smaller electrodes, and electrodes themselves which overcome such difficulties.

BRIEF SUMMARY OF THE INVENTION

Tantalum material particularly adapted for electrode use is described. The tantalum material comprises discreet structures having a cross-section of thin plates of tantalum separated from each other by gaps except at a number of plate intersections where metallurgical bonds are established between the plates to assure that the plates are electrically interconnected within the cross section, which also provides structural stability. The plates in this configuration are substantially parallel to each other along one longitudinal direction, and in this direction the structure can extend indefinitely. If the body were sliced in a plane perpendicular to this longitudinal direction, the sliced end viewed along the longitudinal direction would produce a pattern of interconnected thin plates of tantalum, and this pattern would appear substantially the same no matter where along the length of the structure the slice is made. The gaps between the plates would appear in this view as long, straight channels running longitudinally through the length of the structure; thus the resulting structures have non-tortuous porosity because of the assemblage of these substantially straight, inter-plate gaps. A form of the article wherein the gaps are filled with an auxiliary ductile metal is also described. A capacitor form of such articles is also described including a layer of tantalum oxide on the exposed tantalum surfaces acting as the dielectric of the capacitor and counter electrode contained in the non-tortuous porosity.

The method of making such articles is also described. Tantalum in the form of ductile metal rods, sheets, forgings, and/or powder are inserted into a billet in a prearranged pattern with the lengths of the tantalum pieces parallel to the longitudinal direction of the billet (which will become the longitudinal direction described above for the processed structure). Spaces between the prearranged pattern are filled with a ductile auxiliary metal to maintain the separation of the tantalum pieces during the extrusion and drawing process described below. The billet is reduced to a predetermined size by extrusion and/or drawing in the longitudinal direction along the length of the billet. It is important that the billet be annealed to relieve strain hardening during the reduction process. If the reduced article is not annealed during the reduction process, the auxillary metal will deform at a different rate than the valve metal, thus changing the pattern of the valve metal. Potentially, without the annealing step, the valve metal could harden to the point of fracture during reduction. Typically, the reduced article is annealed each time the billet is reduced up to 85% in cross section, and prefeably each time the billet is reduced up to 75% in cross section. After reduction, the billet is severed at predetermined distances along its drawn length. When the ductile metal is removed, for example, by dissolution with mineral acids, the tantalum article remains, having non-tortuous porosity.

Capacitors made from the above articles can be made in extremely small size, have improved high frequency response, can be designed to have high volumetric efficiency, lower equivalent series resistance, and precise structural form and mechanical stability, resulting in controllable equivalent series inductance.

DETAILED DESCRIPTION OF THE INVENTION

Figure 5:
FIGS. 5 and 6 are longitudinal cross sections of electrodes according to the present invention showing non-tortuous porosity.
Figure 6:
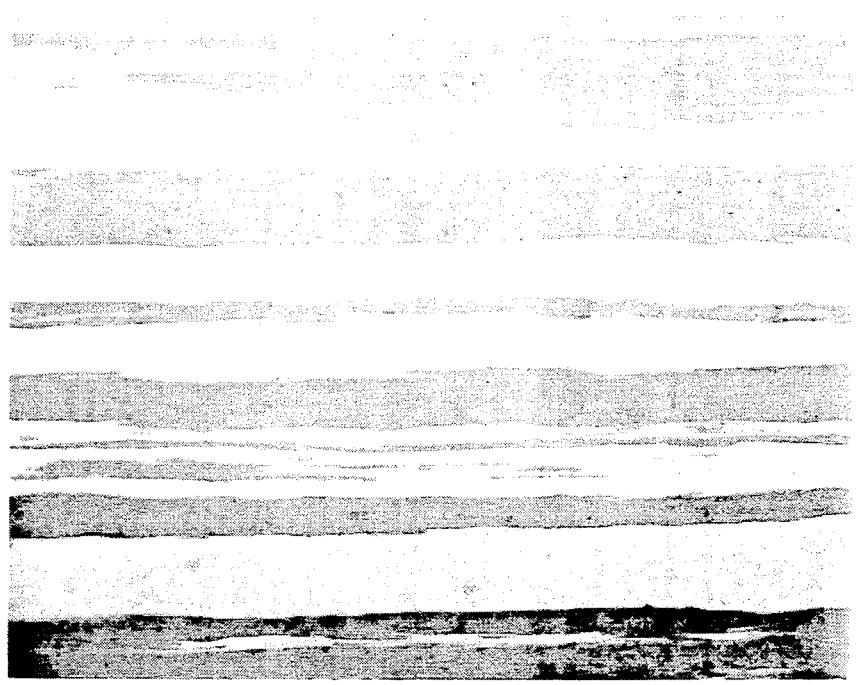
Figure 7:
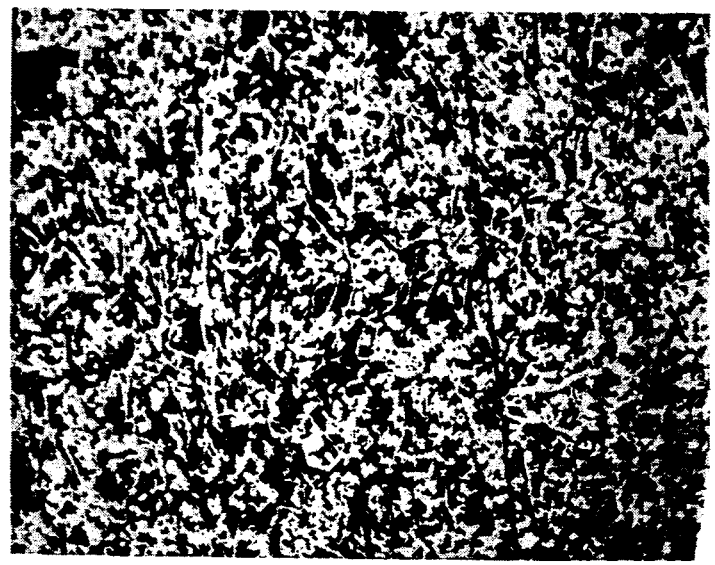
FIG. 7 is a longitudinal cross section of an electrode material made by conventional methods showing tortuous porosity.

A key feature of the electrodes according to the present invention are the opportunities for miniaturization. The electrodes according to the present invention can be made as small as 100 micrograms in weight. In this weight range they are typically less than 0.05 inch in diameter or thickness, and preferably less than 0.015 inch. As described above, with capacitor electrodes made from pelletized tantalum powder, because the channels for electrolyte impregnation into the porous pellet are formed by a bonding of the small particles, the paths in the thus formed electrode can be very tortuous. Note FIG. 7 which is an optical micrograph of a longitudinal cross section of a 0.100 inch diameter electrode body made by conventional powder pressing techniques magnified 200 times where the darker areas represent the tortuous porosity. This has a disadvantage in the high frequency response of the resultant capacitor as well as adversely influencing the volumetric efficiency. The material according to the present invention, because the geometry can be so closely tailored, results in substantially non-tortuous porosity. As stated above, the gaps between the plates appear as long, straight channels running longitudinally through the length of the structure; thus, the resulting structures have non-tortuous porosity because of the assemblage of these substantially straight, inter-plate gaps. Note FIG. 5 which is an optical micrograph of a longitudinal cross section of a 0.015 inch diameter electrode body magnified 200 times and FIG. 6 which is an optical micrograph of a longitudinal cross section of a 0.066 inch diameter electrode body magnified 100 times, where the lighter areas represent this non-tortuous porosity. This makes the introduction of electrolyte much easier and also allows for extreme miniaturization. It also has the added advantage of allowing for the elimination of the need for a lead wire attachment step.

The overall electrode size is typically 200 microns to 1000 microns in diameter (the electrode structures produced according to the present invention can actually be made less than 300 microns in diameter, e.g. 100 to 300 microns, and even as small as less than 50 micron in diameter). The individual "arms" (internal elements of the electrode) are typically 15 microns thick, but can be made smaller, for example, 5 microns and smaller. While it is very design dependent, the gaps typically represent about 30% to 70% by volume of the article, preferably about 40% to 60% by volume, and most typically about 50% by volume of the article.

As also mentioned above, for miniaturized electrode material the lead attachment can be a very difficult, labor intensive task. Because of the method by which the electrode material described herein is made, this entire step can (optionally) be eliminated by, for example, using a portion of the electrode body as the lead wire. Another advantage of the present invention is that many individual electrode structures can be packed into the same billet. For example, practicing the process described herein to produce electrode material initially having a 0.25 inch diameter, which is then sliced and the segments packed into another billet could result in processing 300 electrodes at one time. After extrusion and reduction to the final size, a cross sectional cut through the thus reduced body will produce many (e.g., hundreds) of individual electrode structures, thus allowing for a very rapid and efficient capacitor manufacturing process.

Figure 2:
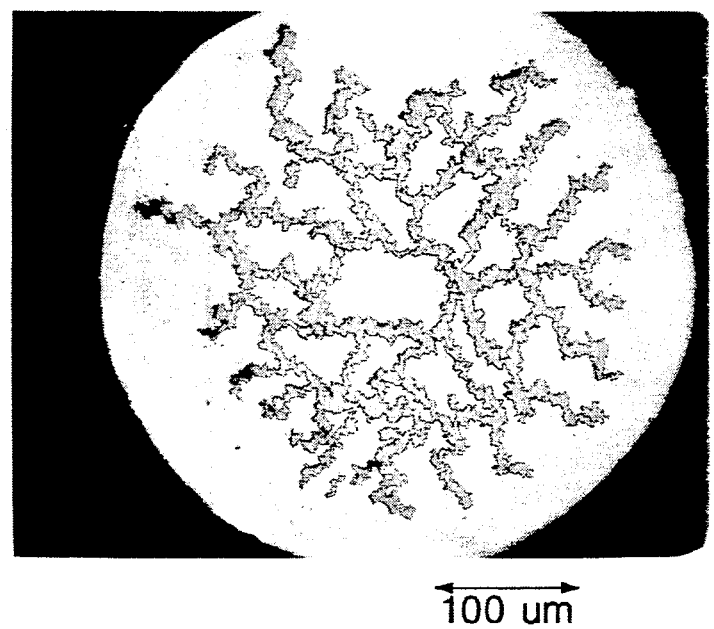
FIG. 2 shows a cross section of a typical capacitor electrode according to the present invention with the auxiliary ductile metal still present.

There are four basic articles of interest according to the present invention. The first one is the valve metal article having electrically continuous thin plates of valve metal containing the auxiliary metal throughout the spaces between and surrounding the valve metal structures. In this form the valve metal component of the article is extremely structurally stable and protected by the presence of the surrounding auxiliary metal. This level of protection from mechanical damage is important to the transportation and handling of the material prior to conversion to the finished capacitors. See FIG. 2 which is an optical micrograph of a transverse cross section of a 0.015 inch diameter electrode body according to the present invention magnified 200 times where the darker central area represents the tantalum and the lighter portion of the circular cross section represents the copper. As an example of the structural stability of this type of article, in this form, the electrode material can actually be provided on a spool, much like ordinary ductile wire, which greatly increases capacitor manufacturing possibilities.

Figure 8:
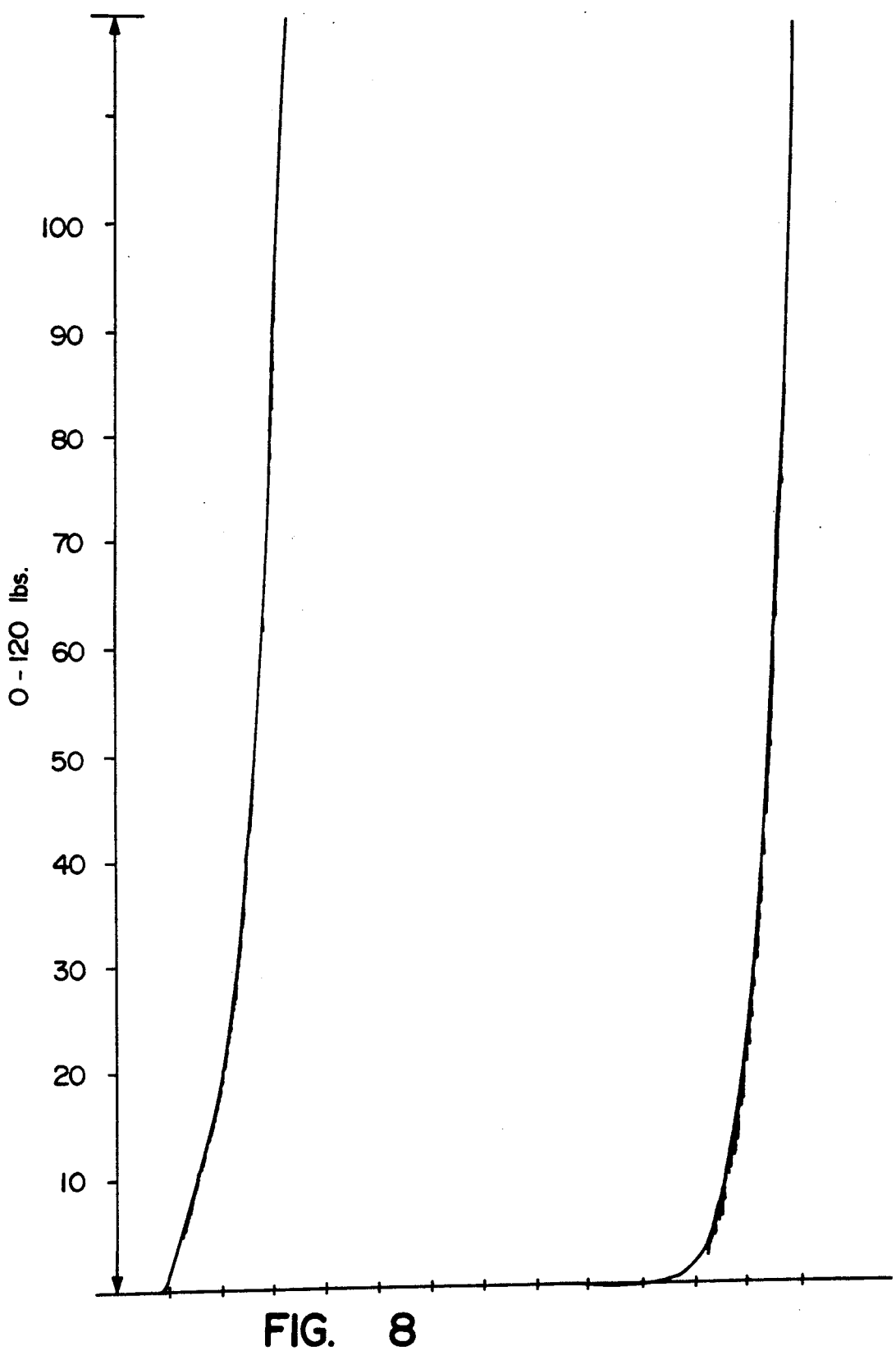
FIGS. 8 and 9 are curves showing deformation under load of electrode material according to the present invention.
Figure 9:
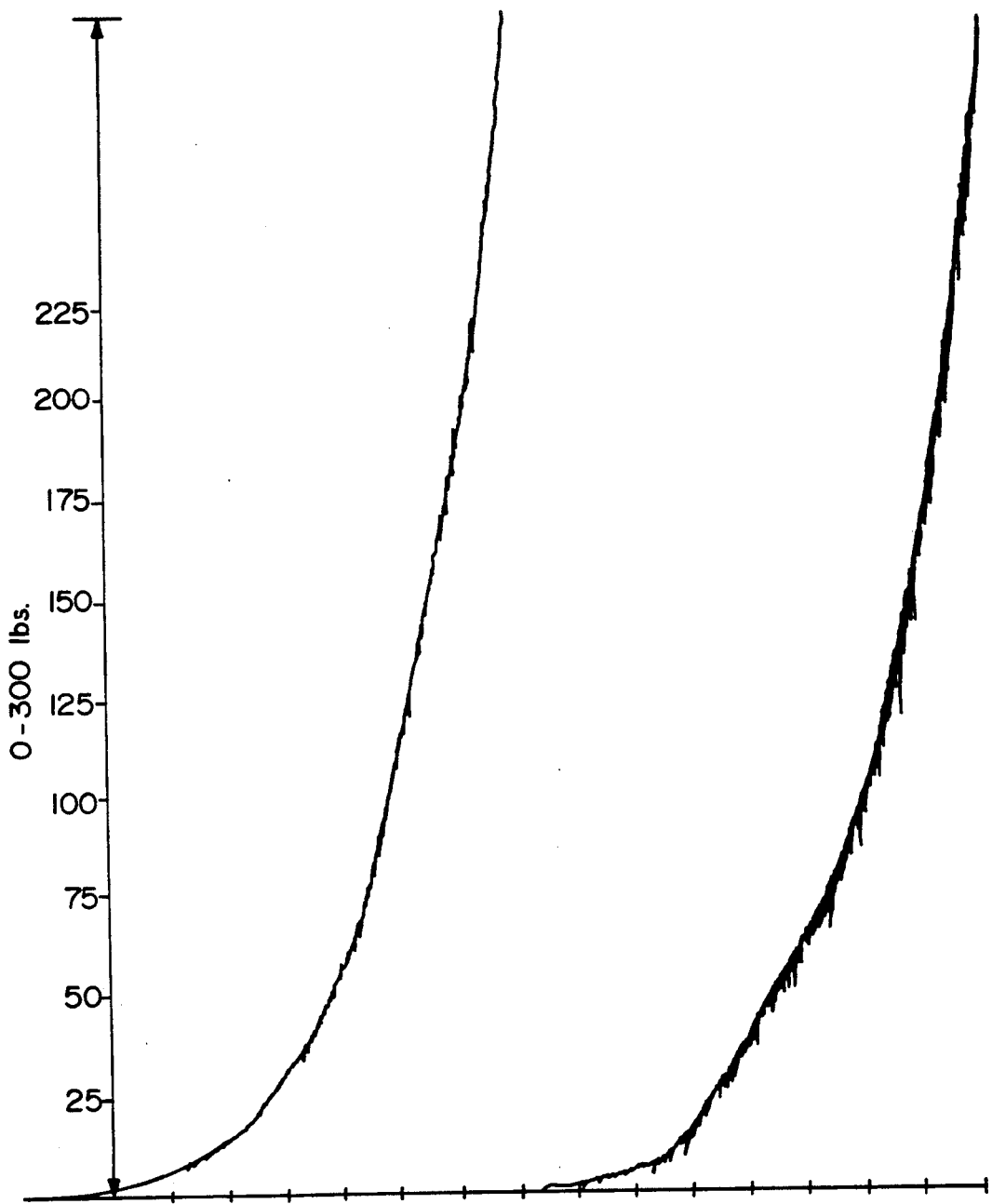
Figure 10:
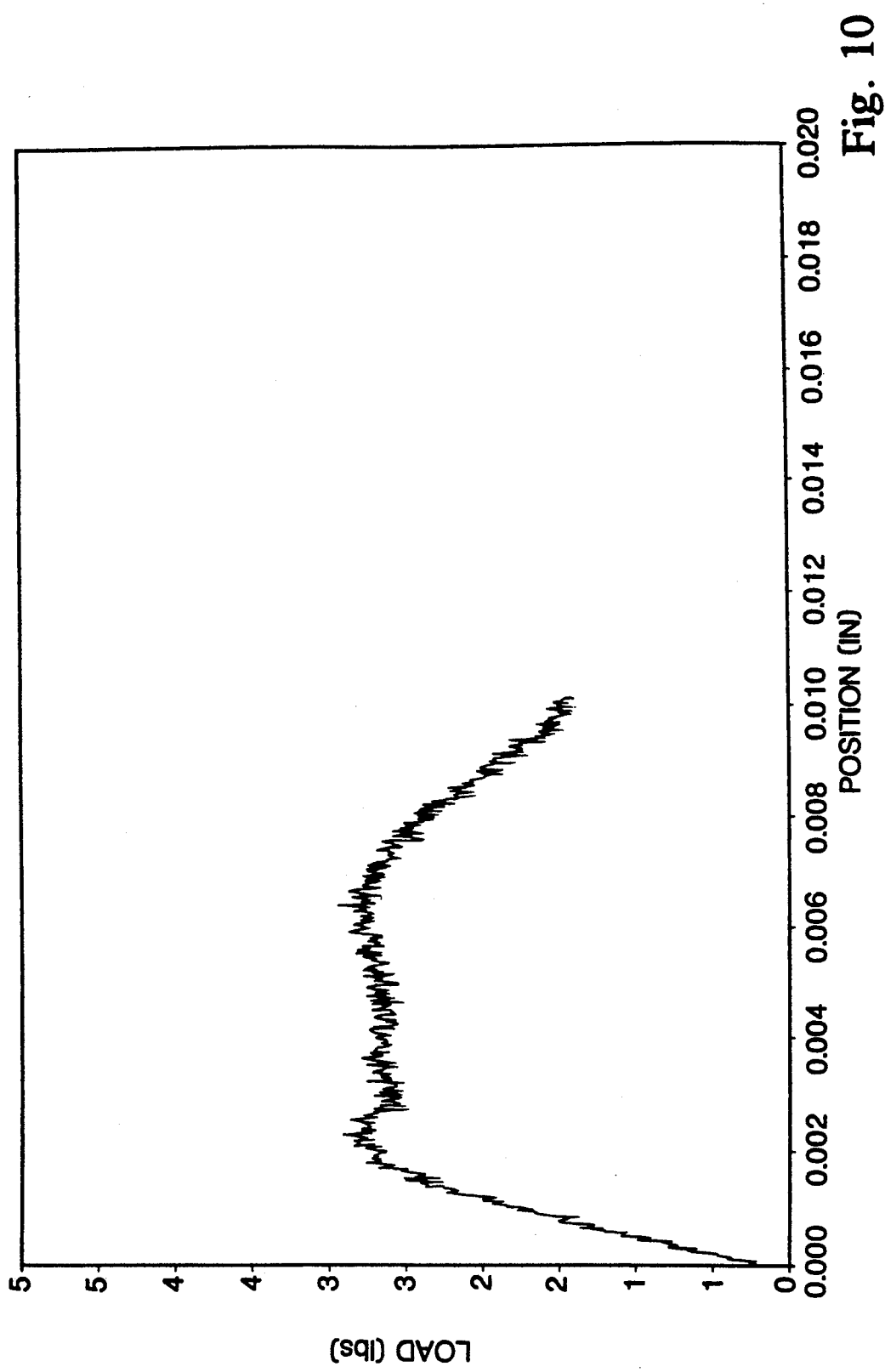
FIG. 10 is a curve showing deformation under load of a conventional electrode made from tantalum powder.

As an example of the structural stability of the articles of the present invention in this form, note FIGS. 8, 9 and 10. These represent the results of compression tests done in accordance with ASTM Standard E-9. Electrodes made according to the present invention were tested having 0.015 inch diameter, and 0.066 inch diameter, diameters measured with copper present. Testing was actually performed after copper removal, which diameters corresponded to 0.01 inch and 0.04 inch with the copper removed. In the flat, on-side position, they deformed gradually, indicating a metallurgically bonded body. (In FIGS. 8 and 9 the applied load is shown in pounds on the vertical axis and the amount of compression shown on the horizontal axis, where each centimeter on the horizontal axis represents 0.0025 inch of compression). A conventional 0.100 inch diameter unsintered electrode made from tantalum powder was also tested and is shown in FIG. 10. As in FIGS. 8 and 9, the load is shown on the vertical axis and amount of compression shown on the horizontal axis. This demonstrates the type of curve which would be present in an article without metallurgical bonding.

Figure 3:
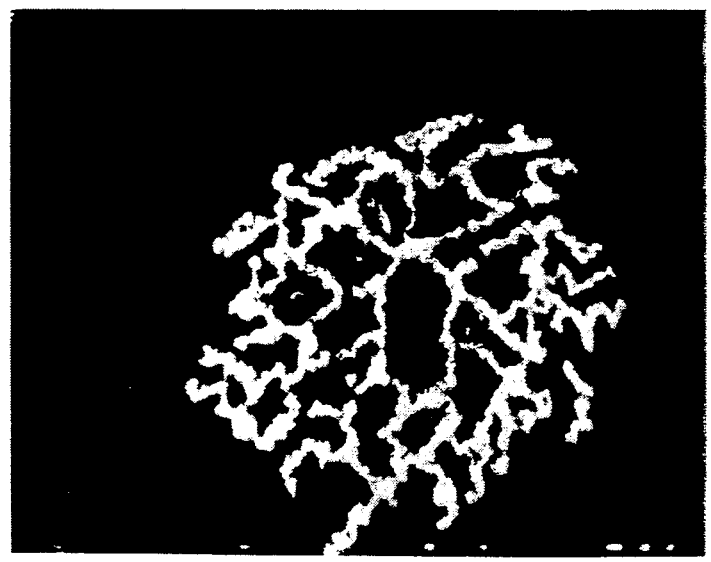
FIGS. 3 and 4 shows typical cross sections of a capacitor electrode according to the present invention with the ductile metal removed.
Figure 4:
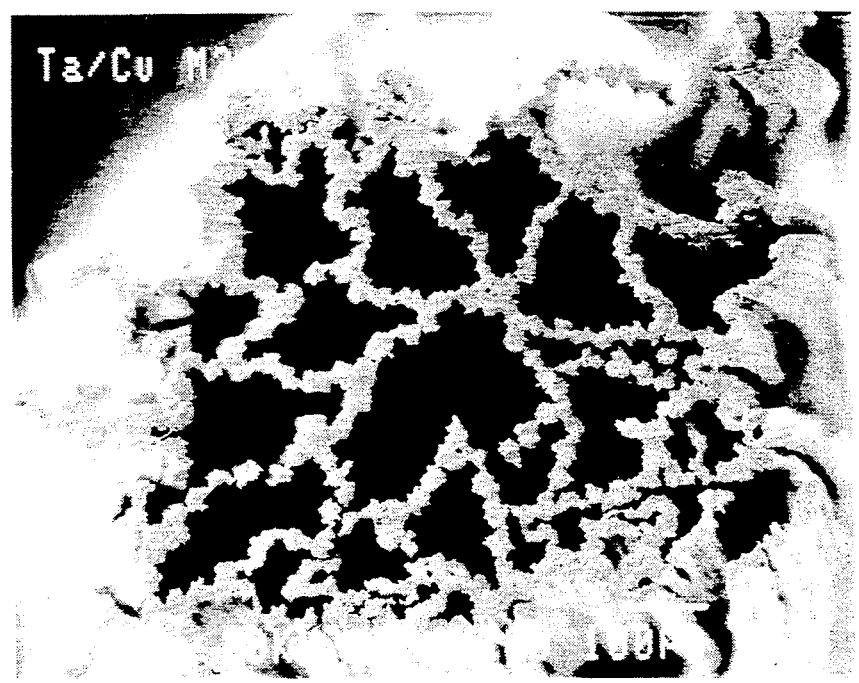

The second embodiment of article of interest is the valve metal matrix with the auxiliary metal removed. This is a particularly useful form for further processing to the capacitor stage. See FIG. 3 which is an optical micrographs of a transverse cross section of a 0.015 inch diameter electrode body according to the present invention magnified 200 times, and FIG. 4 which is a scanning electron micrograph of a fractured and etched 0.066 inch diameter electrode body with copper removed magnified 100 times showing the metallurgical bonding between the tantalum rods. When viewed end-on, as described above, the pattern of valve metal plates can have any configuration. But certain specific configurations can provide special advantages. For instance, the need for maximizing the packing of the plates into a small volume would favor patterns wherein the plates are substantially parallel to each other when viewed end-on. The facility with which the pattern of the valve metal plates can be modified to achieve different purposes is a special advantage of this process. It is important that this structure have virtually no resistance to electrical flow (no voltage drop) between the individual elements, i.e. the parallel plates and the interconnecting rib portions. These segments will typically bond during the reduction process, but could be physically welded in conventional fashion as well.

Another form of the article of interest is the valve metal matrix above with auxiliary metal removed, which has also been anodized. Anodization is a standard procedure where the material is placed in phosphoric acid or other electrolyte and current is run through the article to form an oxide film on the surface of the valve metal. A certain amount of the valve metal is consumed in this process.

Figure 12:
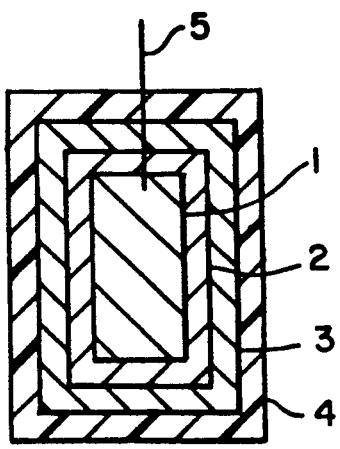
FIG. 12 is an example of a finished capacitor according to the present invention.

An additional embodiment of the present invention is a finished capacitor. This comprises a valve metal matrix which has been anodized and subsequently impregnated with a standard electrolyte such as manganese dioxide or sulfuric acid. The electrolyte fills the interplate pores that run throughout the length of the valve metal electrode body, i.e., the electrolyte fills the non-tortuous porosity referred to above. The thus treated valve metal/dielectric oxide/electrolyte body (see character 1 in FIG. 12) is then covered in conventional fashion and proportions with successive layers of conductor (character 2) such as carbon, a conducting metal (character 3) such as silver, tantalum, or niobium, or alloys thereof, and a plastic casing (character 4) such as polyethylene, polypropylene, or an acrylic polymer.

While the tantalum patterns shown in the Figures are particularly useful patterns, any pattern can be modeled depending upon the end use. In fact, that is one of the advantages of the invention is that depending on the particular use the material is to be put to, the pattern can be customized for maximum efficiency or maximum performance for that use, both in terms of the pattern of the tantalum and the thickness of its component parts.

Another advantage of the present invention is that the microfarad ratings for capacitors according to this invention can be made so low that article performance can approach the range of ceramic materials. However, the articles of the present invention have a significant advantage over ceramic materials insofar as they are reproducible in articles physically much smaller than can be produced with ceramics, and without the temperature sensitivity of the electrical properties that limit ceramic capacitors in certain applications.

With the powder technology based tantalum capacitors, electrical response falls off at the higher frequencies. This is caused in part by the tortuous porosity of the articles. This results in a "skin effect" whereby only the outer layers of the capacitor electrode pellet are effectively available to contribute capacitance to the external circuit. This inability to utilize the interior surfaces of the capacitor electrode with high frequency signals can be partially alleviated by reducing the tortuosity of the pore structure into the interior of the capacitor. In fact this is one of the big advantages of the non-tortuous pores. Recovering some of the high frequency losses caused by tortuosity is a big advantage in this art because the state of electronics in the articles these electrodes would be used in is continually moving towards higher frequency operations. Ceramics don't have a tortuosity problem because they're flat. However, they cannot be made very small and they have an inherent temperature dependence in their capacitance rating. The valve metal articles according to the present invention not only have the advantage of substantially non-tortuous paths, but miniaturization not capable with ceramic materials. Also, the thermal stability of the electrical properties of the valve metal articles according to the present invention is better than ceramic material.

Although the invention has been described in terms of an electrode utility, generically the method can be used for miniaturization of mechanical parts as well, for example, most simple machines (levers, escapements, wheels, gears, etc.), as well as specialized medical implants where cross-sectional structure, electrical capacitance, or longitudinal porosity is advantageous.

Another advantage of the present invention is that the plates as seen in the figures can be laid out so as to be substantially parallel with structural bridges in-between. This can provide mechanical strength for easier handling of the miniaturized electrode material not known in this art.

While the invention has been described in terms of tantalum, other materials useful with the present invention are niobium, tantalum and alloys thereof. Collectively these metals are known as valve metals.

While the structure according to the present invention has been shown as a symmetrical structure (e.g. circular-type cross-section), this is not required. Depending on the particular use involved, asymmetrical structures can also be designed and made for a particular use.

The electrodes according to the present invention have improved ESR-equivalent series resistance. This is a net resistance in the capacitor. The lack of tortuosity would provide lower ESR since the presence of tortuosity would act to increase the length of the conductive path and hence to increase resistance. Similarly, the articles can be designed so as to demonstrate improved ESL-equivalent series inductance. Again, the decreased tortuosity and the ability to control the pattern of tantalum plates can both be taken advantage of to lessen the inductive losses. Overall improvements to these attributes act to extend the high frequency capabilities of the parts which means extending the frequency at which the capacitor made from the material of the present invention still performs as a capacitor.

Another big advantage of the material according to the present invention is in the handling and processing of the material. Only that much of the auxiliary metal needs to be leached out along the length of the electrode to provide the size of the part required. The tantalum and auxiliary metal matrix remaining can be used as a lead wire to supply current for anodizing the exposed tantalum portion without having to add an additional lead wire. This is a significant savings in processing of the electrodes, not even taking into account the difficulty because of the miniaturization aspects. While lead wire lengths will vary depending on the use/application, typically the lead wire will be about twice the diameter dimension of the electrode. For initial handling purposes, it is preferable to have the lead wire about 4 times the length of the electrode. Nickel, valve metal or other conventional lead wires can also be attached in conventional fashion to the electrode, e.g. by welding.

The articles of the present invention also have the property of reduced tantalum consumption per electrode. The skin effects described above waste a lot of tantalum especially at high frequencies. The interior of conventional pellets is not taken advantage of. This has caused manufacturers to make pellets intended for high frequency applications physically large, only to take advantage of the larger exterior surface area. With the process of the present invention, electrodes can be made which can effectively utilize all of the tantalum surface, interior as well as exterior, because of the low tortuosity of the pores leading to the interior surfaces.

Concerning the billets, the material which is used to enclose the tantalum and auxiliary metal (the can), should be made of material which can be easily removed, but also be a material which during extrusion does not easily diffuse into the tantalum. The function of the billet is to keep the rods, bars, etc., in place and to keep the tantalum from oxidizing. While the invention has been described in terms of rods of tantalum (or other valve metal) and auxiliary metal, other forms of the material can also be used. For example, a pre-fabricated structure of welded tantalum rods or plates (or a forged structure) can be made and placed in the can. The gaps can then be filled with auxiliary metal in plate, powder, or molten form. The auxiliary metal should be ductile and basically inert to the tantalum. Copper is preferred. The can is placed around the tantalum and copper, e.g. rods, evacuated and welded shut to seal the air out. It is then hot isostatically pressed (HIP) down to a unitary piece.

Figure 11:
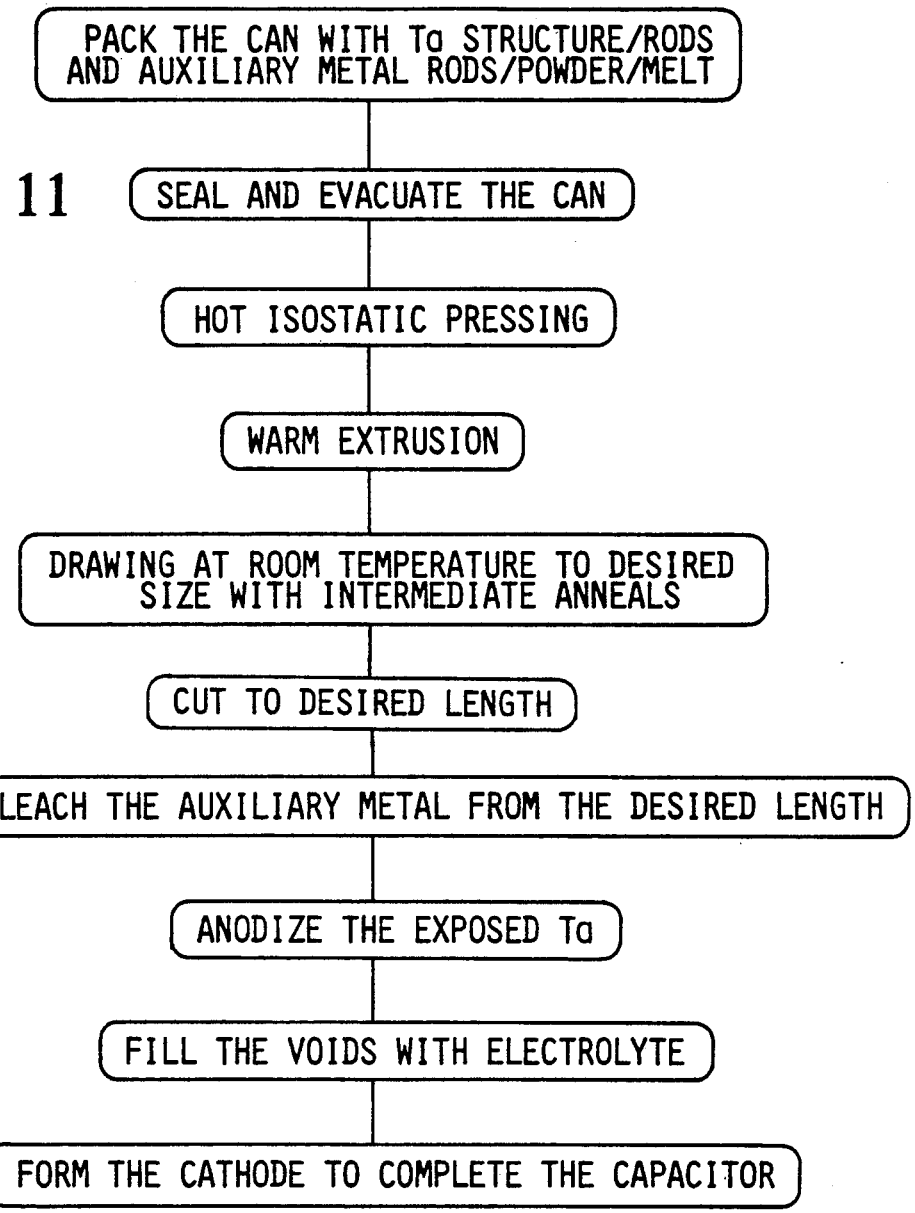
FIG. 11 is a flow chart describing the process according to the present invention.

The can is typically about 0.25 inch thick and in a shape suitable for placement in an extrusion die, typically cylindrical and as long as the press can handle. In the case of a copper can, it is important to use oxygen free copper. Oxygen has a greater affinity for tantalum than for copper. Once the billet is HIPed it is extruded in conventional fashion. The critical part of the process portion of the invention (see FIG. 11) is annealing. It is critical to maintain the shape of the structure as originally designed before reduction. Whenever during the course of reduction of the billet through extrusion or drawing, the diameter is reduced by 85% or less, the material should be annealed at least once. (Extrusion is typically performed by applying pressure to the billet forcing it through the die. It is typically performed at higher temperatures and on material of a larger size than in the drawing process. Drawing is typically performed by pulling the material through the die. It is typically performed at room temperature.)

EXAMPLE 1

Figure 1:
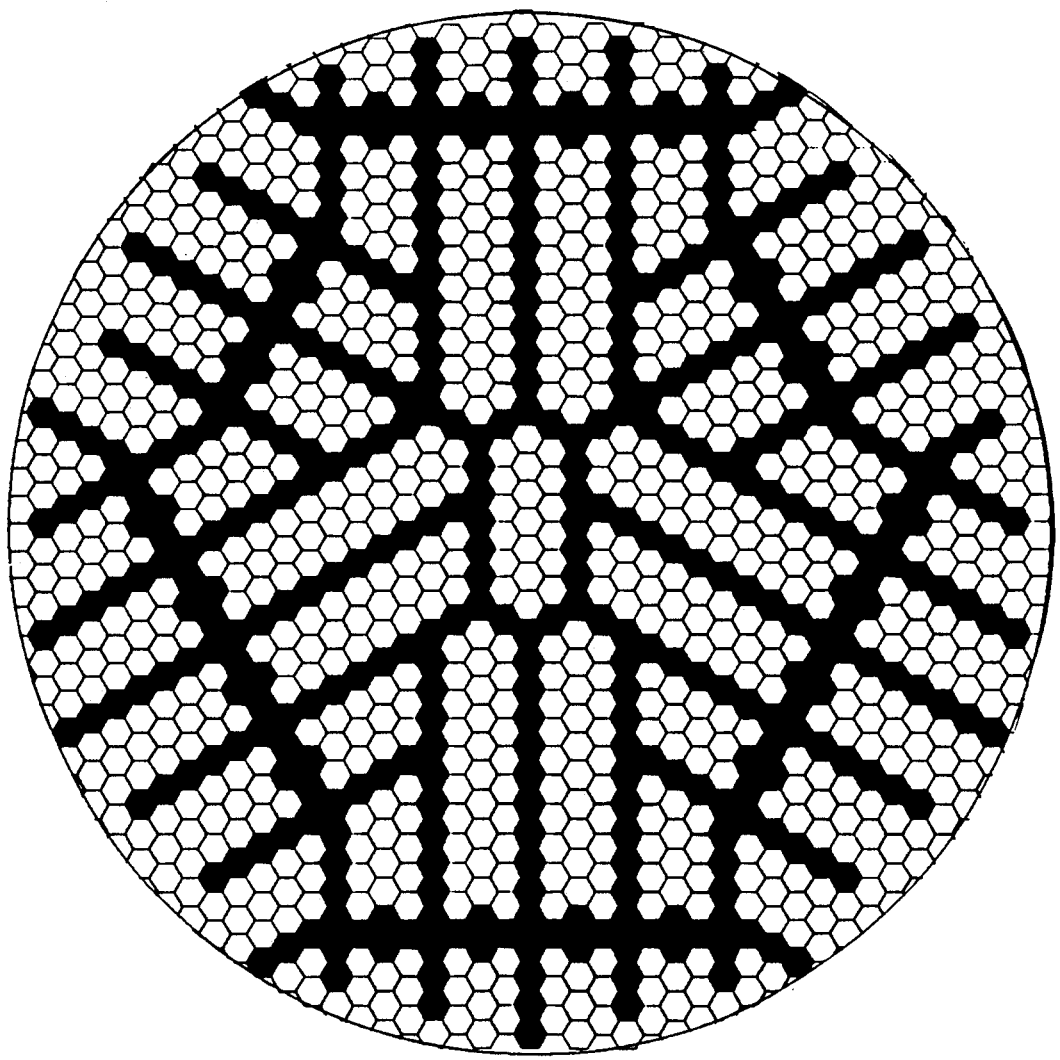
FIG. 1 shows a typical lay-up of hexagonal valve metal and auxiliary ductile metal rods prior to reduction.

Copper and tantalum rods, 0.1 inch in diameter, are cleaned before they are inserted into the copper can. Hexagonal rods were used to improve the fit. See FIG. 1 for an example of an arrangement of tantalum (black hexagonals) and copper (white hexagonals) in the can. Copper lids are placed on the can and welded shut on the top and the bottom and the can is evacuated. It is hot isostatically pressed in conventional fashion to remove any gaps. Ideally all the gaps are filled with rods in the first instance, but because of slight differences in shape, curvature etc. this is not always possible. Once the billet has been HIPed it is pushed through conventional extruders at about 700 degrees centigrade in conventional fashion. The can is about 4 inches in diameter (inner diameter) and it is extruded down to 1.75 inches in diameter. It is then cold drawn down to 0.75 inch and ultimately drawn down to 0.015 inch diameter, again both in conventional fashion. It is critical that the pattern be maintained during drawing to maintain a non-tortuous porosity. Working makes the metals harder and more brittle so the pattern would collapse if it were just reduced down from the 4 inch to the 0.015 inch inner diameter without intermediate heat treatments. Since the metals lengthen at different rates it has been found critical for every 85% reduction in cross sectional area (or less) that an annealing procedure be performed. Typically an annealing cycle of 900 degrees centigrade for 2 hours has been used. This reduces the stress in the metal. It has also been found desirable to fill the center of the can with copper or tantalum to provide added strength. Ideally, as many arms and fins should be designed into the article as possible to maximize surface area, but as stated above the design can be quite a matter of choice. The copper leaching is delayed as long as possible to maintain article strength for machine handling.

EXAMPLE 2

The copper containing tantalum electrodes of Example 1 were regularly acid leached, using ultrasonic vibration to assist copper removal in the small pores. However, a preferred method utilizes an electrolytic removal system devised for this purpose. The electrodes were immersed in a solution of copper sulphate in water and sulfuric acid containing 200 gpl (grams per liter) $H_2SO_4$ and 40 gpl $CuSO_4$ opposite a copper plate which acted as a cathode. When the electrodes were subjected to a very low voltage, for example 0.3 volt to 0.4 volt, the copper went into solution from the electrode and deposited back on the plate. This is referred to as an electroleaching process. Of course, any combination of the above techniques can be used, i.e. conventional acid leaching with or without ultrasonic vibration, and with or without electroleaching.

EXAMPLE 3

Anode bodies were prepared according to the above examples, including copper removal, and were then anodized in a dilute solution of phosphoric acid in water using standard industry procedures. They were then tested for capacitance at different lengths. The test results showed that the anodes performed like standard anodes with one significant exception, the responses were normal responses but not usual for anodes of this size, i.e. this small. The test results are shown in the Table where the diameter is in microns, the approximate length in millimeters, the formation voltage in volts, and the capacitance in microfarads. (Leakage was measured and found to be higher than expected, but the data was not considered reliable because of the lack of ability to prevent electrolyte from contacting the copper in the lead wire section of the anode and, accordingly, is not included here).

TABLE

| Diameter | Length | Formation Voltage | Capacitance |
| --- | --- | --- | --- |
| 254 | 4 | 25 | 0.25 |
| 254 | 4 | 50 | 0.12 |
| 254 | 6 | 25 | 0.65 |
| 254 | 6 | 50 | 0.10 |
| 1016 | 2 | 25 | 1.17 |
| 1016 | 2 | 50 | 0.34 |
| 1016 | 1 | 25 | 0.59 |
| 1016 | 1 | 50 | 0.28 |

In addition to the extreme miniaturization which can now be accomplished with the electrodes according to the present invention, the performance at high frequency and exceptional ESL and ESR, extended high frequency performance and very high volumetric efficiency are other advantages of the present invention. The structural stability and ease of handling for subsequent capacitor processing also represents significant improvement.

We claim:

1. Valve metal material particularly adapted for electrode use having a cross-section of thin plates of valve metal of controlled thickness, the plates separated from each other by spaced gaps of predetermined and controlled dimensions, said plates being electrically continuous by virtue of metallurgical contact at points of plate intersection or through valve metal interconnection of the plates at selected points within said cross-section and said structures being structurally stable and having non-tortuous porosity.

2. The material of claim 1 wherein the largest dimension across the material is less than 0.05 inch.

3. The material of claim 2 wherein the largest dimension is less than 0.015 inch.

4. The material of claim 1 wherein the material is encased in an extrudable auxiliary metal which also fills the gaps between the valve metal material.

5. The material of claim 4 wherein the material is spooled on a roll.

6. The material of claim 4 wherein the auxiliary metal is copper.

7. The material of claim 6 wherein the valve metal is tantalum.

8. The material of claim 1 additionally containing a layer of valve metal oxide on the exposed valve metal surfaces in a thickness of about 0.004 micrometer to about 0.85 micrometer.

9. The material of claim 8 wherein the spaced gaps are impregnated with electrolyte.

10. The article of claim 9 wherein the impregnated body is covered with successive layers of a conductor, a metal, and a polymer.

11. The article of claim 10 wherein the conductor is carbon, the metal is silver, tantalum, columbium, or alloys thereof, and the plastic is polyethylene, polypropylene, or acrylic polymer.

12. A method of making a valve metal article particularly adapted for electrode use comprising substantially filling a billet can with valve metal and ductile auxiliary metal in a prearranged pattern of valve metal spaced apart by gaps caused by the presence and arrangement of the ductile auxiliary metal, reducing down the billet to a predetermined size, removing the ductile metal, and generating a layer of valve metal oxide on the exposed valve metal surfaces.

13. The method of claim 12 wherein at least one of the valve metal or ductile auxiliary metal prior to being placed into the billet is in the form of rods, sheets, forgings, powder, or a combination thereof.

14. The method of claim 12 wherein at least one of the valve metal or ductile auxiliary metal is in the form of rods or sheets or a combination thereof.

15. The method of claim 12 wherein the structure is severed at predetermine points along its length.

16. The method of claim 12 wherein the billet can is copper.

17. The method of claim 12 wherein the ductile auxiliary metal is copper.

18. The method of claim 12 including annealing the billet each time the billet is reduced up to 75% in cross-section.

19. The method of claim 12 wherein the ductile auxiliary metal is removed by electrolytically applied voltage and/or by acid leaching, with or without ultrasonic vibration.

20. The method of claim 19 wherein the voltage used is 0.3 to 0.4 volt.

21. The method of claim 12 including severing the article at a predetermined length, and removing a portion of the auxiliary metal along the length of the article from the severed end.

22. The method of claim 12 wherein the predetermined size comprises is between about 0.1 millimeter and 10 millimeters.

23. The method of claim 12 wherein the layer is formed electrolytically utilizing a voltage between about 2 and 500 volts.

24. The method of claim 12 wherein the predetermined size comprises a thickness less than 0.05 inch.

25. The method of claim 12 wherein the predetermined size comprises a thickness less than 0.015 inch.

26. The method of claim 12 wherein spaced apart gaps are impregnated with electrolyte.

27. The method of claim 26 the impregnated body is covered with successive layers of a conductor, a metal, and a polymer.

28. The method of claim 27 wherein the conductor is carbon, the metal is silver, tantalum, columbium, or alloys thereof, and the plastic is polyethylene, polypropylene, or acrylic polymer.

29. The method of claim 12 wherein the thus reduced article is severed and the severed pieces assembled in a billet can to substantially fill the can and the reduction process repeated thus producing a plurality of valve metal articles.

* * * * *